United States Patent [19]

Kim

[11] Patent Number: 5,232,784

[45] Date of Patent: Aug. 3, 1993

[54] RELEASE FILM FOR LABEL STOCK

[75] Inventor: Hachul C. Kim, Rochester, N.Y.

[73] Assignee: Mobil Oil Corporation, Fairfax, Va.

[21] Appl. No.: 811,125

[22] Filed: Dec. 20, 1991

[51] Int. Cl.$^5$ .............................................. B32P 13/12
[52] U.S. Cl. .................................... 428/451; 428/520; 428/906
[58] Field of Search ................ 428/40, 447, 500, 451, 428/520, 906

[56] References Cited

U.S. PATENT DOCUMENTS

| | | | |
|---|---|---|---|
| 4,306,050 | 12/1981 | Koerner et al. | 528/26 |
| 4,326,005 | 4/1982 | Reed et al. | 428/336 |
| 4,678,846 | 7/1987 | Weitemeyer et al. | 525/477 |
| 4,859,511 | 8/1989 | Patterson et al. | 428/512 |
| 4,996,088 | 2/1991 | Knittel et al. | 428/40 |

Primary Examiner—Edith Buffalow
Attorney, Agent, or Firm—A. J. McKillop; G. W. Hager; J. P. O'Sullivan

[57] ABSTRACT

A release film for label stock including a film substrate having a coating of a silicone-acrylate release material which includes a quaternary ammonium salt therein.

5 Claims, No Drawings

RELEASE FILM FOR LABEL STOCK

BACKGROUND OF THE INVENTION

The present invention relates to a release film, a major utility of which is to protect and carry label stock until the label is put into use on an appropriate surface.

For many years labels have been prepared with an adhesive applied to one side thereof. In instances where the adhesive is a pressure sensitive adhesive, some means had to be provided to protect the adhesive surface in advance of applying the label to the ultimate surface to be labeled. A technique has evolved over the years by which the pressure sensitive adhesive is protected by bringing the adhesive surface into contact with a release layer which has little tendency to aggressively adhere to the pressure sensitive adhesive surface. Thus, a second film having a release surface is brought into contact with the pressure sensitive surface carried by the label protecting the pressure sensitive adhesive until the label is applied to it's ultimate surface. It is to be understood that the pressure sensitive adhesive can be applied to the release surface and the label stock thereafter applied to the adhesive surface. On removal of the label the pressure sensitive adhesive will preferentially adhere to the label stock.

Release films oftentimes are manufactured apart from the label face stock. The release film is manufactured by applying a commercially available release material to one side of the release film and the combination is then convolutely wound into a roll stock. Ultimately this roll stock must be unrolled and slit to a width dimension suited to a particular label dimension. Next a pressure sensitive layer is applied over the release layer and this is mated with the underside of a sheet of label stock. Alternatively the label stock can have the pressure sensitive adhesive applied to its undersurface which in turn is mated with the release label. Following this, label indicia is printed onto the surface of label and, thereafter, the label is die cut so that it can be separated from the release sheet-label stock combination.

During the unwinding of release film roll stock for re-dimensioning purposes, an expensive problem has arisen. After the release material is applied as a coating layer on the substrate and subjected to electron beam curing and during the convoluted winding of the stock, a portion of or a fraction of the release material is transferred to the back side of the release film. Later when this release roll is unwound to receive label stock thereon, and subsequently rewound, some release material or a fraction thereof transfers to the surface of the label stock prior to the label stock receiving printed indicia. This transferred release material causes imperfections to occur during the label printing process. The transferred release material interferes with printing. This leads to the need to discard the combination of material at a point when the product is almost completely ready for use or marketing. This presents an intolerable, costly waste.

It is an object of the present invention to present a release film which is not subject to the problem of the transfer of release material to a label surface to be printed.

SUMMARY OF THE INVENTION

The present invention relates to a release film for a label stock comprising a film substrate having on one side thereof a coating of a silicone-acrylate release material, said coating including therein a quaternary ammonium salt.

DETAILED DESCRIPTION OF THE INVENTION

In preparing the release film of the present invention the substrate can be any suitable material, for example, paper, thermoplastic film, etc. A preferred substrate is an oriented polypropylene. Particularly preferred is biaxially oriented isotactic polypropylene. This substrate material can, in turn, be composed of one or a plurality of individual layers designed to improve the overall quality of the substrate. The substrate can be transparent or opaque.

Any release material effective for use in protecting the back side of label stock prior to label application is contemplated. A particularly preferred class of release materials are those broadly identified as "silicone acrylate" release materials. A description of these materials and how they are made are found in U.S. Pat. No. 4,678,846, to Weitemeyer et al, and U.S. Pat. No. 4,306,050 to Koerner et al, the contents of which are incorporated herein by reference in their entirety.

The release material of the present invention includes (meth)acrylate ester modified organopolysiloxane mixtures, comprising essentially equilibrated organopolysiloxanes with, on the average, more than 25 to fewer than 200 silicone atoms and which additionally contain 2 to 30 weight percent of organopolysiloxanes with, on the average, 2 to 25 silicone atoms and 2 to 30 weight percent of organopolysiloxanes with, on the average, 200 to 2,000 silicone atoms.

As used herein, the organopolysiloxane fractions having more than 25 to less than 200 silicone atoms are sometimes referred to as the first fraction, those having 2 to 25 silicone atoms are referred to as the second fraction, and those having 200 to 2,000 silicone atoms are referred to as the third fraction.

Especially preferred are those (meth) acrylate ester modified organopolysiloxane mixtures which contain, besides the essentially equilibrated organopolysiloxane with, on the average, more than 25 to fewer than 200 silicone atoms, 5 to 20 weight percent of organopolysiloxanes with, on the average, 5 to 25 silicone atoms and 5 to 20 weight percent of organopolysiloxanes with, on the average, 200 to 2,000 silicone atoms.

The organopolysiloxanes contained in the organpolysiloxane mixtures preferably correspond to the formula:

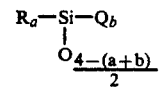

in which R is an alkyl radical with 1 to 4 carbon atoms, preferably, the methyl radical. R may, however, also be a vinyl or phenyl radical. Moreover, the R radical may also represent different moieties in the molecule, so that some R radicals represent methyl radicals and the other R radicals may, for example, represent a vinyl or a phenyl radical. Preferably, at least 90% of the R radicals are alkyl radicals, especially methyl radicals.

Q is an organic radical which contains the acrylate or methacrylate ester groups. Preferably, the acrylate or methacrylate ester radical is linked to the silicone atom through an SiOC bridge. The acrylate or methacrylate radical may moreover be derived from pentaerythritol triacrylate, pentaerythritol trimethacrylate, dipentaerythritol pentaacrylate, dipentaerythritol pentamethacrylate, ditrimethylolpropane triacrylate, ditrimethylolpropane trimethacrylate, ditrimethylolethane triacrylate, ditrimethylolethane trimethacrylate, trimethylolpropane di(meth)acrylate, trimethylolethane di(meth)acrylate, glycerin di(meth)acrylate, hydroxyethyl acrylate, hydroxpropyl acrylate and neopentyl glycol monoacrylate.

The acrylate or methacrylate ester radical may, however, also be linked through an SiC bridge with the organopolysiloxane.

a has a value of 1.0 to 2.2; b has a value of 0.001 to 1.6. The fractions of different average molecule weight contained in the inventive acrylate or methacrylate ester modified organopolysiloxane mixtures may differ in respect to the R and Q radicals and the a and b subscripts.

Organosilicone species in the above referenced silicone acrylate release coatings are believed to migrate from the coating to adjacent contacting surfaces. The cause of this migration may be nonfunctionalized silicone remaining in the release coating. These migratable species are not bound or fixed in the cured coating and thus will migrate to adjacent contacting surfaces. It has been found that by including a quaternary ammonium salt in the silicone acrylate material prior to applying it to the release substrate that by some reaction the migratable material is either prevented from migrating or converted to a material which has no adverse effect on label printing. What is known is that the inclusion of the quaternary ammonium salt solve this expensive problem. The silicone acrylate release coating normally is applied to the substrate in a quantity of from about 0.2–1.2 grams/1000 in$^2$, preferably about 0.7 g/1000 in$^2$.

The quaternary ammonium salt can be added to the silicone acrylate release coating material in a proportion of from 0.2–8 wt %. The substrate can be from 1.8 to about 2.2 mils thick. Examples of quaternary ammonium salts include the following:

Dimethylaminoethyl methacrylate dimethyl sulfate ("Madquat Q-5" by Norsolac, Inc.)

(3-Lauramidopropyl)trimethyl ammonium methyl sulfate ("Cyastat LS" by American Cynamid)

Stearamidopropyl-dimethyl-2-hydroxyethyl ammonium nitrate ("Cyastat SN" by American Cynamid)

N,N-bis(2-hydroxyethyl)-N-(3-dodecycloxy-2hydroxypropyl)methyl ammonium methyl sulfate ("Cyastat 609" by American Cynamid)

Stearamidopropyl-dimethyl-2-hydroxyethyl ammonium dihydrogen-phosphate ("Cyastat SP" by American Cynamid)

Trialkylalkyletherammonium salts (e.g. Emerstat 6660-A from Henkel Corp.)

Examples of the release film in accordance with the present invention in comparison with a prior art release film is shown below. The release compositions were coated onto a 2.0 mil biaxially oriented polypropylene and cured by conventional electron beam radiation technique. The release coating was a silicone-acrylate identified as RC450 from Th. Goldschmidt of Essen, Germany, to which was added 2,4 and 8% by weight of trialkylalkyletherammonium salt. The release force (grams/inch) was measured using a TESA4154 tape and a TLMI release force tester. The film was convolutely wound and so held for a period of 1 week at 125° F., so that the magnitude of release material transfer to the back side of the film could be measured. The film was then unrolled and the rating of ink wetting was measured using a #8800 Berol magic marker. Rating 1 = high silicone migration, causing a severe ink wetting problem; rating 10 = no silicone migration, i.e., no ink wetting problem. The results are shown in the table below.

TABLE

| Sample No. | Cured Coating Formulation | Release Force | Degree of Ink Wetting |
|---|---|---|---|
| (a) | Release coating | 37 g/in | Rating 1 |
| (b) | (a) +2% additive | 32 g/in | Rating 8 |
| (c) | (a) +4% additive | 27 g/in | Rating 8 |
| (d) | (a) +8% additive | 28 g/in | Rating 8 |

The above data shows the outstanding decrease in the amount of transferred or migrated release material to the back side of the release film. The data also shows that the quaternary ammonium salt modified silicone-acrylate release material decreased the release force to a moderate extent, thus maintaining its release effectiveness.

It will be apparent to those skilled in the art that the specific embodiments discussed above can be successfully repeated with ingredients equivalent to those generically or specifically setforth above and under variable process conditions. From the forgoing specification, one skilled in the art can readily ascertain the essential features of this invention and without departing from the spirit and scope thereof can adapt it to various diverse applications.

What is claimed is:

1. A release film for label stock comprising a film substrate having on one side thereof a coating of a silicone-acrylate release material, said coating including a quaternary ammonium salt therein in an amount sufficient to prevent any transfer of said release material from said one side thereof.

2. The film of claim 1 wherein said substrate is an oriented thermoplastic film.

3. The film of claim 2 wherein said substrate is an isotactic polypropylene film.

4. The film of claim 3 wherein said quaternary ammonium salt is present in said release material in from about 0.2–8% by weight.

5. In a release film for label stock comprising a film substrate having on one side thereof a coating of a silicone-acrylate release material, a minor fraction of said release material having a tendency to undesirably transfer to the opposite side of said release film upon convolute winding thereof, the improvement consisting of including in said release material an amount of a quaternary ammonium salt sufficient to prevent any meaningful transfer of said release material from said one side to any other surface.

* * * * *